United States Patent
Li

(10) Patent No.: US 9,519,469 B2
(45) Date of Patent: Dec. 13, 2016

(54) CLOUD INFRASTRUCTURE-BASED MANAGEMENT SYSTEM AND METHOD FOR MAINTENANCE AND DEPLOYMENT OF APPLICATION SYSTEM

(71) Applicant: Huawei Technologies Co., Ltd., Shenzhen, Guangdong (CN)

(72) Inventor: Sihao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/327,092

(22) Filed: Jul. 9, 2014

(65) Prior Publication Data

US 2014/0325503 A1    Oct. 30, 2014

Related U.S. Application Data

(63) Continuation of application No. PCT/CN2012/085501, filed on Nov. 29, 2012.

(30) Foreign Application Priority Data

Jan. 9, 2012   (CN) .......................... 2012 1 0004379

(51) Int. Cl.
G06F 9/445    (2006.01)
G06F 9/455    (2006.01)
(Continued)

(52) U.S. Cl.
CPC ............. G06F 8/61 (2013.01); G06F 9/45533 (2013.01); G06F 9/5083 (2013.01);
(Continued)

(58) Field of Classification Search
CPC .. G06F 9/5072; G06F 9/5077; G06F 9/45558; G06F 9/45533; G06F 9/455; G06F 8/61; H04L 67/10
See application file for complete search history.

(56) References Cited

U.S. PATENT DOCUMENTS 8,132,166 B2 *  3/2012  DeHaan .................... G06F 8/61
                                                                717/171

8,352,608 B1 *  1/2013  Keagy ....................... G06F 8/63
                                                                709/220
(Continued)

FOREIGN PATENT DOCUMENTS

| CN | 101763266 A | 6/2010 |
|----|-------------|--------|
| CN | 101938416 A | 1/2011 |
| CN | 102195890 A | 9/2011 |

OTHER PUBLICATIONS

Kusaka et al., Queuing theoretic approach to server allocation problem in time-delay cloud computing systems, Sep. 2011, 2 pages.*

(Continued)

*Primary Examiner* — Thuy Dao
(74) *Attorney, Agent, or Firm* — Leydig, Voit & Mayer, Ltd.

(57) ABSTRACT

The present invention discloses a cloud infrastructure-based management system and method for maintenance deployment of an application system. A cloud infrastructure-based method for maintenance and deployment of an application system, comprising: obtaining a scheduling deployment policy of an application; obtaining performance of an application instance or task processing state data of the application instance; and performing application scheduling deployment according to the scheduling deployment policy of the application and the performance of the application instance or the task processing state data of the application instance, generating a deployment instruction for the application instance, and completing deployment configuration of the application instance, wherein the deployment instruction comprises an application attribute and a range of attribute values. In this way, the present invention support automatic deployment of an application system, avoiding software re-architecture needed for the application system's migration deployment from a traditional system to a cloud platform.

17 Claims, 11 Drawing Sheets

(51) Int. Cl.
*G06F 9/44* (2006.01)
*G06F 11/34* (2006.01)
*G06F 9/50* (2006.01)
*G06F 11/30* (2006.01)

(52) U.S. Cl.
CPC ...... *G06F 11/3003* (2013.01); *G06F 11/3055* (2013.01); *G06F 11/3089* (2013.01); *G06F 11/34* (2013.01); *G06F 11/3433* (2013.01); *G06F 2009/45562* (2013.01); *G06F 2201/815* (2013.01); *G06F 2201/865* (2013.01)

(56) References Cited

U.S. PATENT DOCUMENTS

| | | | | |
|---|---|---|---|---|
| 8,468,535 | B1* | 6/2013 | Keagy | G06F 8/63 718/1 |
| 8,555,017 | B2* | 10/2013 | McCann | G06F 3/0604 711/165 |
| 8,713,564 | B2* | 4/2014 | Rosu | G06F 9/5088 718/1 |
| 9,218,176 | B1* | 12/2015 | Alberti | G06F 9/45504 |
| 2005/0091366 | A1 | 4/2005 | Acharya | |
| 2011/0213875 | A1 | 9/2011 | Ferris et al. | |
| 2011/0231899 | A1* | 9/2011 | Pulier et al. | 726/1 |
| 2011/0271273 | A1* | 11/2011 | Dumais | H04L 67/42 717/175 |
| 2012/0110237 | A1* | 5/2012 | Li et al. | 711/6 |
| 2012/0304191 | A1* | 11/2012 | Morgan | 718/105 |
| 2015/0113532 | A1* | 4/2015 | Huang | H04L 67/10 718/1 |
| 2015/0261559 | A1* | 9/2015 | Sliwa | G06F 9/45558 718/1 |

OTHER PUBLICATIONS

Warneke et al., Nephele: efficient parallel data processing in the cloud, Nov. 2009, 10 pages.*

"Hadoop 2.3.0 Release Notes," pp. 1-208, Apache Software Foundation, Forest Hill, Maryland (Feb. 24, 2014).

* cited by examiner

CLOUD INFRASTRUCTURE-BASED MANAGEMENT SYSTEM AND METHOD FOR MAINTENANCE AND DEPLOYMENT OF APPLICATION SYSTEM

CROSS-REFERENCE TO RELATED APPLICATIONS

This application is a continuation of International Patent Application No. PCT/CN2012/085501, filed on Nov. 29, 2012, which claims priority to Chinese Patent Application No. 201210004379.4, filed on Jan. 9, 2012, both of which are hereby incorporated by reference in their entireties.

TECHNICAL FIELD

The present invention relates to the field of cloud systems and, in particular, to a cloud infrastructure-based management system and a cloud infrastructure-based method for maintenance and deployment of an application system.

BACKGROUND

With maturity of cloud technologies, large-scale software systems such as a BSS/OSS system of telecommunications service providers and various service platforms have more or less defects under a traditional operation and maintenance mode: for example, high purchasing cost, a silo system, a sub-system corresponding to a set of hardware resource system such as storage, database, server, and a software binding with a hardware; low resource utilization rate, service configuration based on peak value without the capability of fully sharing resources; very long service launch cycle from proposing a new service to experiencing software development cycle as well as hardware approval and purchasing arrival period; low maintenance efficiency, high labor costs, low standardization of various systems without the capability of centralized maintenance and monitor; poor energy efficiency ratio, low device density, expanding telecommunication equipment room resources, non-environmental-friendly electricity power consumption, and the like.

As such, the industry tends to implement migration deployment of large software systems from traditional silo systems to cloud platforms, thereby solving the above-mentioned challenges. In the prior art, MapReduce (Mapreduce) is used as a software architecture to distribute large-scale concurrent computation tasks to bottom-layer resources. However, to implement real time scheduling based on MapReduce and similar technologies, a software system must be implemented by application re-architecture and development according to the framework.

SUMMARY

The major technical problem solved by the present invention is to provide a cloud infrastructure-based management system and a cloud infrastructure-based method for maintenance and deployment of an application system, so that the deployment adjustment and the maintenance to the application system (for example, a BSS/OSS, Business Support System/Operation Support System) can be performed automatically without re-architecting the existing software system.

In order to solve the above technical problem, the present invention adopts a technical solution of providing a cloud infrastructure-based management system for maintenance deployment of an application system. The management system includes an application scheduling deployment engine, a deployment plug-in, and a monitoring plug-in. The application scheduling deployment engine is configured to perform application scheduling deployment according to a scheduling deployment policy of an application and performance of an application instance in the application or task processing state data of the application instance, and generate a deployment instruction for the application instance, where the deployment instruction includes an application attribute and a range of attribute values. The deployment plug-in is configured to obtain the deployment instruction for the application instance from the application scheduling deployment engine, and perform deployment configuration to the application instance. The monitoring plug-in is configured to monitor performance or task processing state of the application instance, and transmit the performance of the application instance or the task processing state data of the application instance to the application scheduling deployment engine.

In order to solve the above technical problem, the present invention adopts another technical solution of providing a cloud infrastructure-based method for maintenance deployment of an application system. The method includes: obtaining a scheduling deployment policy of an application, and obtaining performance of an application instance or task processing state data of the application instance; and performing application scheduling deployment according to the scheduling deployment policy of the application and the performance of the application instance or the task processing state data of the application instance, generating a deployment instruction for the application instance, and completing deployment configuration of the application instance; where the deployment instruction includes an application attribute and a range of attribute values.

The present invention can achieve the beneficial effects of avoiding software re-architecture needed for an application system's migration deployment from a traditional silo system to a cloud platform, by obtaining load and performance state information of an application instance and performing deployment to the application instance according to the load and performance state information.

BRIEF DESCRIPTION OF DRAWINGS

In order to better describe technical solutions according to embodiments of the present invention, the following briefly describe drawings necessary for illustrating the embodiments. Obviously, the drawings below are merely for illustrating some embodiments of the present invention, and other drawings can be obtained by those skilled in the art based on these drawings without any creative work. Among the drawings.

DESCRIPTION OF EMBODIMENTS

The flowing describes the present invention in details with reference to drawings of the specification.

Figure 1:
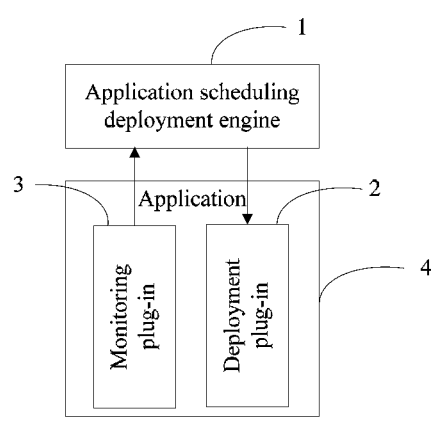
FIG. 1 is a schematic block diagram of a cloud infrastructure-based management system for maintenance and deployment of an application system according to a first embodiment of the present invention.

Referring to FIG. 1, FIG. 1 illustrates a schematic block diagram of a cloud infrastructure-based management system for maintenance and deployment of an application system according to a first embodiment of the present invention. In this embodiment, the management system includes an application scheduling deployment engine 1, a deployment plug-in 2 and a monitoring plug-in 3.

The monitoring plug-in 3 is set in an application 4, and configured to monitor the performance or task processing state of an application instance in the application 4 (not illustrated in FIG. 1), and transmit the performance of the application instance or the task processing state data of the application instance to the application scheduling deployment engine. The application scheduling deployment engine 1 is configured to perform application scheduling deployment based on a scheduling deployment policy of the application and the performance of an application instance in the application or task processing state data of the application instance, and generate a deployment instruction for the application instance. The deployment instruction includes an application attribute and a range of attribute values. The deployment plug-in 2 is also set in the application 4, and configured to obtain the deployment instruction for the application instance from the application scheduling deployment engine 1 and perform deployment configuration to the application instance. The application 4 is for example a program executed, data requiring computation or organization, and the like.

Figure 2:
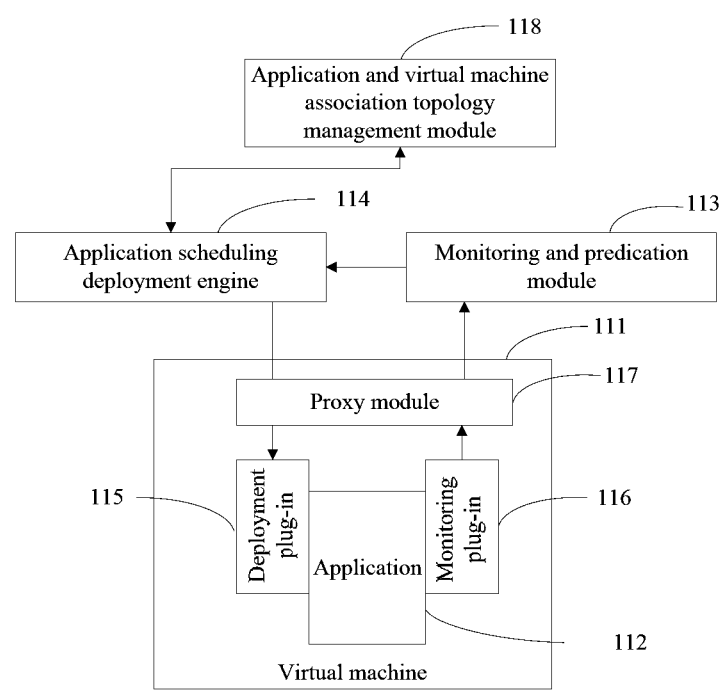
FIG. 2 is a schematic block diagram of a cloud infrastructure-based management system for maintenance and deployment of an application system according to a second embodiment of the present invention.

Referring to FIG. 2, FIG. 2 illustrates a schematic block diagram of a cloud infrastructure-based management system for maintenance and deployment of an application system according to a second embodiment of the present invention. In this embodiment, the management system includes a virtual machine 111, a monitoring and prediction module 113, an application scheduling deployment engine 114, a deployment plug-in 115, a monitoring plug-in 116 and a proxy module 117.

The virtual machine 111 is configured to run the application 112. Each application 112 has at least one application instance (not illustrated in FIG. 2).

The monitoring and prediction module 113 is configured to obtain the performance of an application instance or task processing state data of the application instance, and make a record, for example, a task processing progress of the application instance, a load of the application instance, and the like; and further perform a trend judgmental prediction of the application instance based on currently recorded data and previously recorded data, and transmit currently recorded data and the judgmental prediction.

The application scheduling deployment engine 114 performs application scheduling deployment according to a scheduling deployment policy of the application 112 and the performance of an application instance or task processing state data of the application instance obtained by using the monitoring and prediction module 113, and generate a deployment instruction for the application instance. The deployment instruction includes specifying an application attribute and a range of attribute values for the application instance, and implementing combination of application instances, dividing one application instance into multiple application instances, deleting application instances, and the like.

The deployment plug-in 115 is customized for the application in the virtual machine 111. The deployment instruction performs deployment configuration to the application instance by using the deployment plug-in 115.

The monitoring plug-in 116 is customized for the application in the virtual machine 111. The performance or task processing state of an application instance may be monitored by using the monitoring plug-in, so that the performance of the application instance or the task processing state data of the application instance is obtained.

The proxy module 117 is embedded into the application instance in the virtual machine 111. The monitoring plug-in 116 provides, corresponding to a coding name of the application instance, the performance of the application instance or the task processing state data of the application instance to the monitoring and prediction module 113 by using the proxy module 117. The deployment plug-in 115 obtains a deployment instruction form the application scheduling deployment engine 114 by using the proxy module 117, where the deployment instruction carries the coding name of the application instance.

Specifically, an application instance in the virtual machine 111 is created based on a virtual machine mirror file; the deployment plug-in 115, the monitoring plug-in 116 and the proxy module 117 need to be written into the image file of the virtual machine in advance, and the deployment plug-in 115, the monitoring plug-in 116 and the proxy module 117 are automatically copied during creation of the virtual machine.

In addition, the management system further includes an application and virtual machine association topology management module 118. The application and virtual machine association topology management module 118 is configured to manage association relationship between applications 111, between application instances, and between an application instance and a virtual machine 111, and use the association relationship as a decision basis when the application scheduling deployment engine 113 adjusts deployment of the application instance.

In other embodiments, the monitoring and prediction module 113 includes a monitoring module and a prediction module, which are described in the following embodiments.

Unlike the prior art, in the first embodiment of the present invention, the cloud infrastructure-based management system for maintenance and deployment of an application system obtains performance of an application instance or task processing state data of the application instance, and performs deployment to the application instance according to a scheduling deployment policy and the performance or task processing state data, thereby avoiding software re-architecture needed for a large application system's migration deployment from a traditional system to a cloud platform.

In a second embodiment of the present invention, a cloud infrastructure-based method for maintenance and deployment of an application system includes:

obtaining a scheduling deployment policy of an application;

obtaining performance of an application instance or task processing state data of the application instance;

performing application scheduling deployment according to the scheduling deployment policy of the application and the performance of the application instance or the task processing state data of the application instance, generating a deployment instruction for the application instance, and completing deployment configuration of the application instance; where the deployment instruction includes an application attribute and a range of attribute values.

The deployment instruction includes an application attribute and a range of attribute values. The application attribute and the range of attribute values include an application instance name or code, an application service attribute and a range of attribute values, and are used to indicate a range of tasks processed for the application instance. Specifically, the deployment instruction includes: deploying the application as multiple application instances, dividing one application instance into multiple application instances, or combing and compressing multiple application instances.

Figure 3:
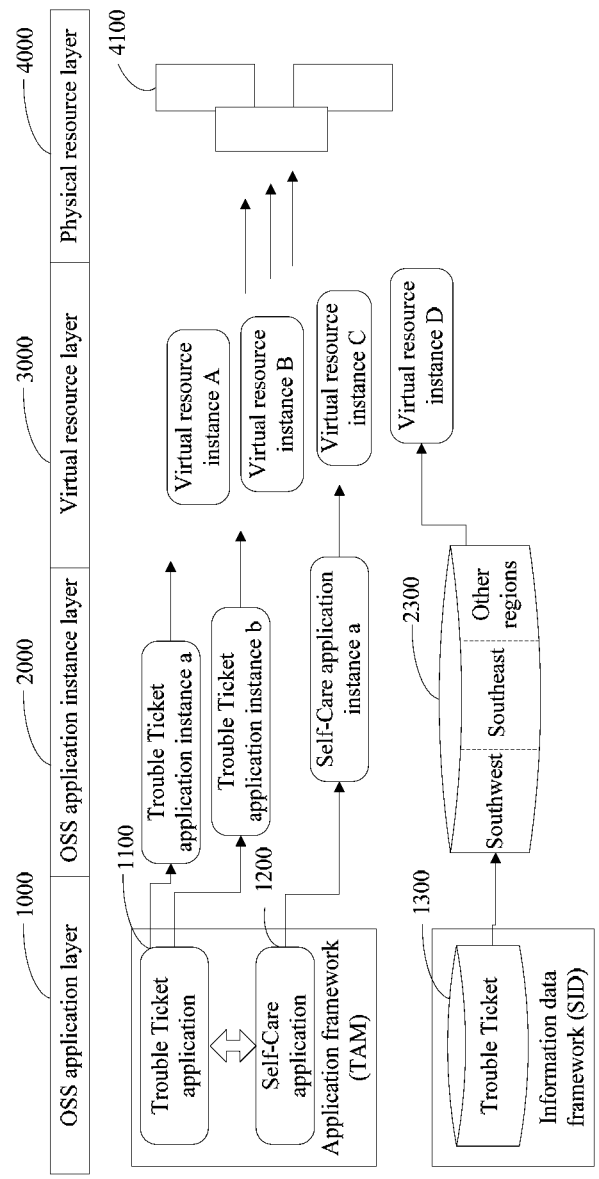
FIG. 3 is a specific application scenario example of a second embodiment of the present invention in an OSS system.

Referring to FIG. 3, FIG. 3 illustrates a specific application scenario example of a second embodiment of the present invention in an OSS system. Generally, an OSS application can be deployed as multiple instances according to a deployment rule (for example, according to location attributes or network types of different managed networks), where the instances are deployed on different virtual resources which are eventually deployed on different physical resources. In a specific application scenario example, the application system includes an OSS application layer 1000, an OSS application instance layer 2000, a virtual resource layer 3000, and a physical resource layer 4000.

In the virtual resource layer 3000, the instances of the OSS application instance layer 2000 are converted to a virtual resource instance A, a virtual resource instance B, a virtual resource instance C, and a virtual resource instance D. The virtual resources are eventually deployed on different physical resources 4100 of the physical resource layer 4000.

The running state of a virtual machine affects the running state of an application instance, and the running state of a single application instance affects the deployment way and quantity of the application. The running states of the virtual machine and the application instance need to be monitored, and be used as a deployment decision basis.

The deployment target platform is a cloud infrastructure, by using which virtual resources can be flexibly applied for. This builds a foundation for automation of the application applying for deployment resources, and achieves relatively dynamic sharing of resources between different applications.

The deployment target, OSS system, has a plurality of applications, for example, a Trouble Ticket application 1100 and a Self-Care application 1200. Applications are associated with each other. For example, if a customer submits a complaint by using the Self-Care, a trouble ticket corresponding to the complaint will be formed in the Trouble Ticket for ease of trouble identification. That is, input of the Trouble Ticket application 1100 is output of the Self-Care application 1200, which collaboratively implement a customer complaint disposal procedure. According to objects of deployment, migration may be divided into three levels, including: procedure migration, application migration, and data migration. The procedure migration refers to, based on the application migration, considering association relationship between applications, analyzing impacts to associated applications during migrating part of the applications, and making deployment adjustment to the associated applications. Data migration includes data system connection configuration, data association relationship management, migration scheduling, migration state monitoring, migration error processing. To maintain a Session uninterrupted, an incremental migration manner may be used. The present invention mainly implements application migration, and data migration is not described in detail with specific implementation schemes.

Figure 4:
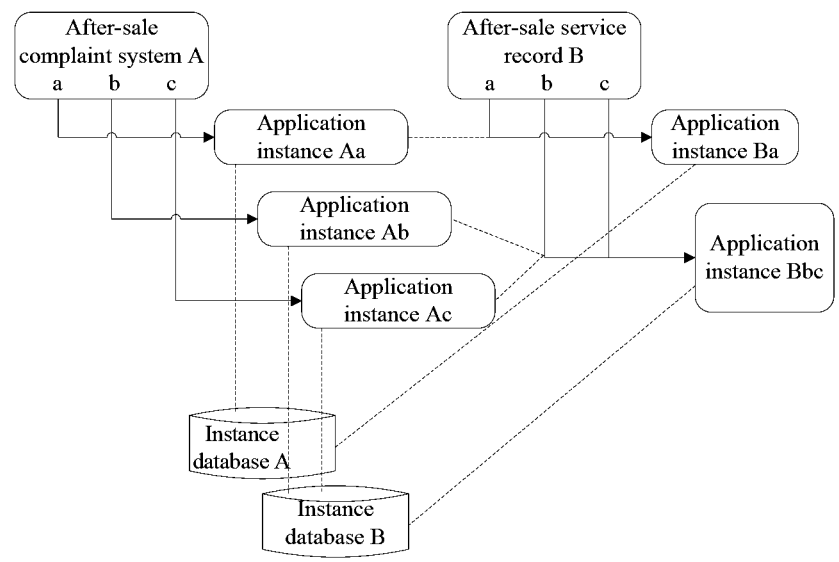
FIG. 4 is a schematic diagram before deploying an application instance of the specific application scenario in FIG. 3.
Figure 5:
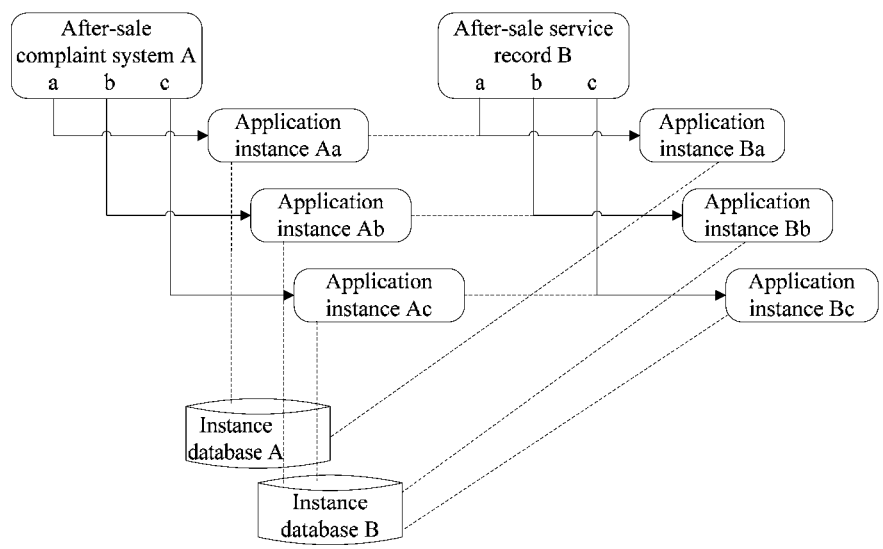
FIG. 5 is a schematic diagram after deploying the application instance of the specific application scenario in FIG. 3.

Referring to FIG. 4 and FIG. 5, where FIG. 4 is a schematic diagram before deploying an application instance of the specific application scenario in FIG. 3, and FIG. 5 is a schematic diagram after deploying the application instance of the specific application scenario in FIG. 3.

An after-sale complaint system A is a system running the Self-Care application 1200, and an after-sale record system B is a system running the Trouble Ticket application 1100. A customer submits a complaint against a product failure by using the after-sale complaint system A, while the after-sale record system B makes a record according to the complaint in the after-sale complaint system A. As such, output of the after-sale complaint system A is input of the after-sale record system B. In addition, the after-sale complaint system A induces data of the application into three portions of a, b, c. For example, portion a represents the east region, portion b represents the northwest region, portion c represents the southwest region, which correspond to an application instance Aa, an application instance Ab, and an application instance Ac, respectively. Likewise, the after-sale record system B also includes three portions corresponding to portions a, b, c of the after-sale complaint system A, which correspond to an application instance Ba and an application instance Bbc, respectively. In other words, the application instance Aa corresponds to the application Ba, the application instances Ab and Ac correspond to the application instance Bbc. The application instances Aa and Ba correspond to an instance database A; the application instances Ab, Ac and Bbc correspond to an instance database B.

Referring to FIG. 5, when the application scheduling deployment engine 114 detects overload of the application instance Bbc from the performance of the application instance Bbc or task processing state data of the application instance Bbc obtained by the monitoring and prediction module 113, the application scheduling deployment engine 114 performs application scheduling deployment according to scheduling deployment policy, and generates a deployment instruction for the application instance Bbc. Then the application instance Bbc is divided by the deployment plug-in 115 into an application instance Bb and an application instance Bc. In addition, the association relationships between the application instances Bb, Bc and the application instances Ab, Ac are modified. That is, the application instance Ab corresponds to the application instance Bb; and the application instance Ac corresponds to the application instance Bc. The application instance Bbc corresponds to the west region; the application instance Bb corresponds to the northwest region; and the application instance Bc corresponds to the southwest region. The application instance Aa, and the application instance Ba correspond to an instance database A; the application instance Ab, the application instance Ac and the application instance Bbc correspond to an instance database B.

Assuredly, the above embodiments only describe a simple application instance allocation. In other embodiments, one application instance may correspond to multiple association relationships, and multiple association relationships and the storage location of the corresponding data in the database, and the like may need to be modified during re-deployment.

Figure 6:
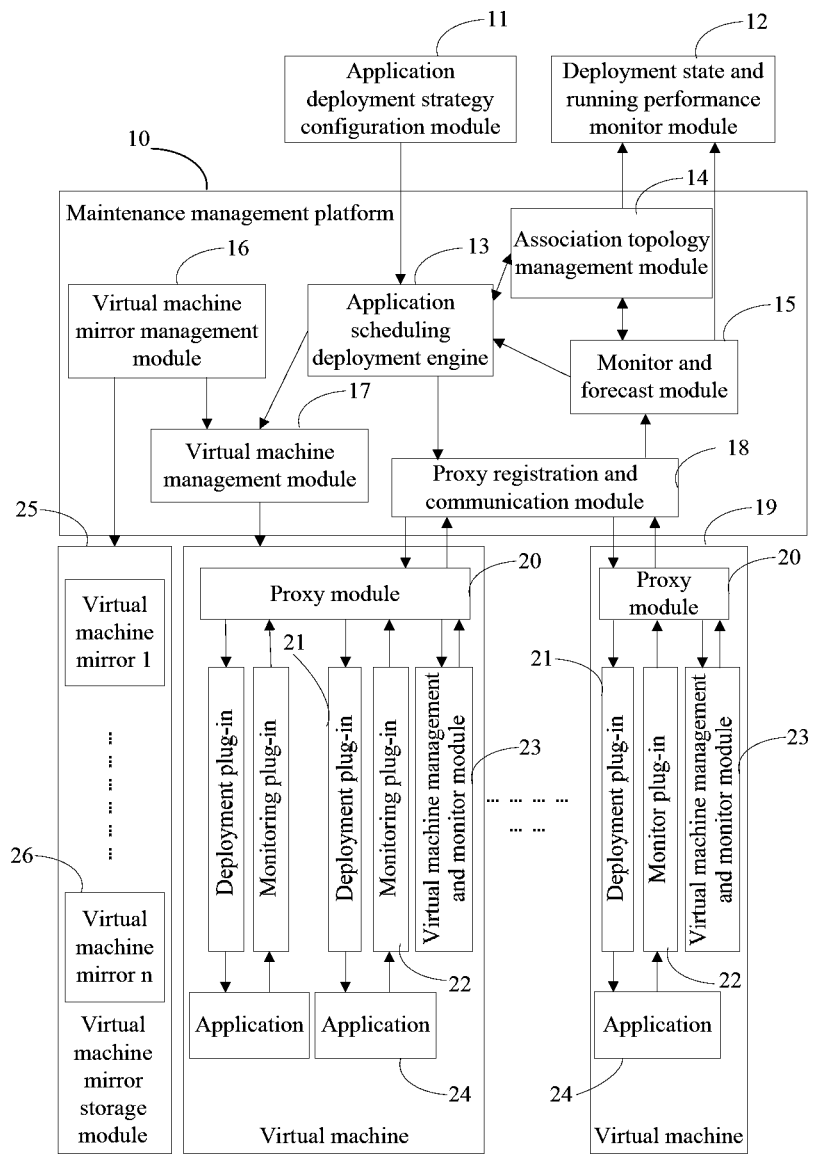
FIG. 6 is an implementation architecture diagram of a cloud-based system for application maintenance and deployment according to a third embodiment of the present invention.

Referring to FIG. 6, FIG. 6 illustrates an implementation architecture diagram of a cloud-based system for application maintenance and deployment according to a third embodiment of the present invention. In this embodiment, the application maintenance system includes an application deployment policy configuration module 11, a deployment state and running performance monitoring module 12, a maintenance management platform 10, a proxy module 20, a deployment plug-in 21 and a monitoring plug-in 22. The maintenance management platform 10 further includes an application scheduling deployment engine 13, an association topology management module 14, a monitoring and prediction module 15, a virtual machine mirror management module 16, a virtual machine management module 17 and a proxy registration and communication module 18.

The application deployment policy configuration module 11 is configured to make a scheduling deployment policy for an application 24 to the application scheduling deployment engine 13. The scheduling deployment policy of the application 24 is to determine division of tasks based on a service feature, determine decomposition of an application instance based on a decomposition threshold, or determine combination of application instances based on a combination threshold. The scheduling deployment policy of the application 24 particularly includes a service feature, a decomposition threshold, and a combination threshold. If the application divides tasks based on a service feature so as to be deployed as multiple application instances, the instance tasks need to be further decomposed when a load of the application instance or the task to be processed is above a threshold, or the application instances need to be combined and compressed when the load of the application instance or the task to be processed is below the combination threshold.

The monitoring plug-in 22 is connected to the application 24 and the proxy module 20, or set in the application 24, and obtains the performance of the application or the task processing state data of the application instance from the application 24, and sends the performance or the task processing state data of the application instance to the proxy module 20. The application 24 runs in virtual machines 19. One or more application 24 can run in each virtual machine 19. In this embodiment, each monitoring plug-in 22 individually corresponds to one application 24. In other embodiments, one monitoring plug-in 22 may correspond to multiple applications 24, or multiple monitoring plug-ins 22 may correspond to different application instances of the same application 24. The monitoring plug-in 22 is customized to different applications 24, rather than all of the monitoring plug-ins 22 are the same.

The proxy module 20 is connected to the application 24 by using the monitoring plug-in 22, mainly responsible for the proxy of the application 24, and may receive the performance of the application 24 or task processing state data of the application 24 from the monitoring plug-in 22, and send the performance of the application 24 or the task processing state data of the application 24, which further carry a proxy module identification, to the proxy registration and communication module 18. Preferably, a proxy module 20, responsible for communication, is set in each virtual machine 19. In other embodiments, the proxy module 20 may directly obtain the performance of the application 24 or task processing state data of the application 24, and send the performance or the task processing state data to the application scheduling deployment engine 13, thereby the monitoring module 22 may be omitted.

The proxy module 20 sends a registration request to the proxy registration and communication module 18, to establish the connection and the communication between the proxy module 20 and the proxy registration and communication 18. The proxy registration and communication module 18 is responsible for the communication between the proxy module 20 and other modules, including registration and change of the proxy module 20, issuing of an application deployment instruction and feedback of instruction execution results, data monitoring of the performance of the application 24 or task processing state data of the application 24. The proxy registration and communication module 28 receives from the proxy module 20 the performance of the application 24 or the task processing state data of the application 24, and sends the performance or the task processing state data to the monitoring and prediction module 15.

The monitoring and prediction module 15 is connected to the proxy registration and communication module 18, collects and manages the application 24 or the performance of each instance of the application 24 or the task processing state data of each instance of the application 24, and outputs to the application scheduling deployment engine 13, which will be serving as decision basis. In another preferred embodiment, the monitoring and prediction module 15 compares the performance of the application 24 or task processing state data of the application 24 with history information, predicts the load and state which the application 24 will reach, and sends the prediction result to the application scheduling deployment engine 13, which will be serving as a condition in deciding whether the application 24 needs to be re-deployed.

The application deployment engine 13 is connected to the application deployment policy configuration module 11 and the monitoring and prediction module 15, and is configured to determine whether the application 24 needs to be re-deployed based on the performance of the application 24 or data processing state date of the application 24 and the scheduling deployment policy, and send a deployment instruction to the application 24 that needs to be re-deployed. For example, if it finds the load of the application 24 may be above or below the threshold set in the scheduling deployment policy, then it may send a deployment instruction of re-deployment to the application 24. Meanwhile, the association topology relationship between this application 24 and other applications 24 stored in the association topology management module 14 is considered, and the impact of performing a local deployment adjustment on an associated object is considered. Upon deciding the scheduling deployment policy of the application 24, the application scheduling deployment engine 13 sends a deployment instruction to the proxy registration and communication module 28; the proxy registration and communication module 18 sends the deployment instruction to the proxy module 20 based on the proxy module identification carried in the deployment instruction; and the proxy module 20 sends the deployment instruction to the deployment plug-in 21.

The deployment plug-in 21 is connected to the proxy module 20, and re-deploys the application 24 according to the deployment instruction. For example, it divides one application 24 into two or more applications 24 when the load of the application 24 is above the threshold set in the scheduling deployment policy, and in the mean time modifies the association relationships of the application instances resulting from the division. Alternatively, it adds an instance to one application 24, divides one existing instance into two instances, and modifies the association relationship corresponding to the instances.

Referring to FIG. 6, the monitoring plug-in 22 further obtains an operational result of the application 24, and sends the operational result to the application scheduling deployment engine 13 through an interface module 20, the proxy registration and communication module 18, and the monitoring and prediction module 15. In other embodiments, the operational result may directly be sent to the application scheduling deployment engine 13 by the proxy registration and communication module 18. The association topology management module 14 is connected to the monitoring and prediction module 15 and the application scheduling deployment engine 13; when the operation result is successful, the application scheduling deployment engine 13 sends a change notification of the association relationship between the application 24 and the virtual machine 19 to the association topology management 14 and stores the notification.

Referring the FIG. 6, in a preferred embodiment, instances of each application 24 correspond to a virtual machine 19, the association relationships between instances of the original application 24 and instances of the new application 24 and other application 24 are all the association relationships between individual virtual machines 19. If the re-deployment of the application 24 is to divide one application 24 into multiple ones, a new virtual machine 19 needs to be created. A virtual machine 19 may be created in two ways. One is to physically copy the virtual machine 19 corresponding to the original application 24 by using the virtual management module 17, and create a new virtual machine 19. During the copy, the original application 24 in the virtual machine 19 needs to be suspended and no new task is accepted, so that data of the copied new virtual machine 19 is consistent with that of the original virtual machine 19. The other way is to write software information of the original application 24 into virtual machine mirror 26 by using the virtual machine mirror management module 16, and create a new virtual machine 19 by using the virtual mirror 26. The virtual machine mirror 26 is stored in the virtual machine mirror storage module 25. After a new virtual machine 19 is created, the deployment plug-ins in the original virtual machine 19 and the new virtual machine 19, according to the deployment instruction, allocate at least a portion of tasks of the instances of the original application 24 is into instances of the new application 24, and reset the association relationships between instances of the original application 24 and instances of the new application 24 and other applications 24.

In this embodiment, the monitoring plug-in 22, the deployment plug-in 21 and the proxy module 20 are written into a virtual machine mirror file in advance, and the monitoring plug-in 22, the deployment plug-in 22 and the proxy module 20 are automatically copied during the procedure of creating the virtual machine 19. Further, the creation of an application instance is performed based on the virtual machine mirror file.

Referring to FIG. 6, the deployment state and running performance monitoring module 12 is connected to the monitoring and prediction module 15, the association topology management module 14, and displays the association relationship between the performance of an application instance or task processing state data of the application instance and the application. The deployment state and running performance monitoring module 12 receives from the deployment monitoring module 15 the performance of the application 24 or task processing state data of the application 24 for review. A user may examine the state of the application instance by using the deployment state and running performance monitoring module 12, and may adjust the scheduling deployment policy of the application instance by using the application deployment policy configuration module 11. In addition, the application scheduling deployment engine 13 may perform dynamic and automatic scheduling deployment to the application instance, thereby eventually realizing the automatic expansion of application service processing capability, and simplifying the deployment and monitoring of the large application system.

In other embodiments, when determine that the load of the application 24 may be below the threshold set in the scheduling deployment policy, instances of two or more applications 24 may be combined.

Figure 7:
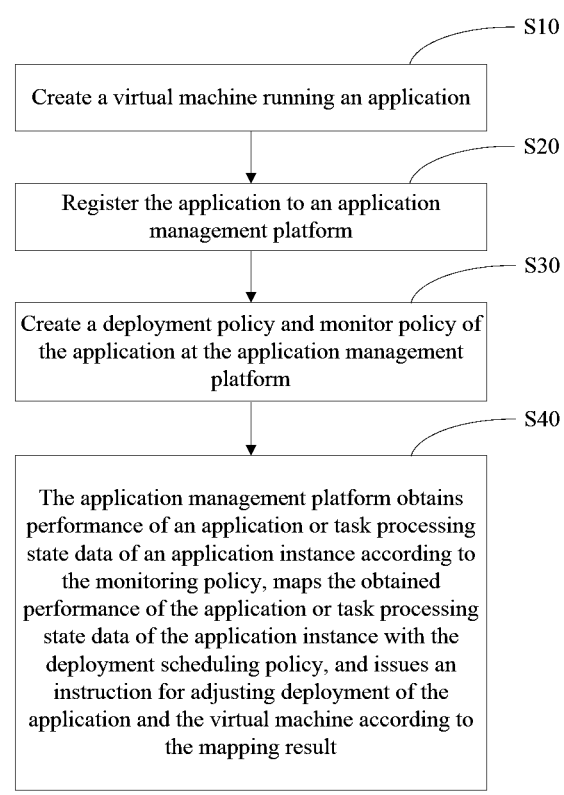
FIG. 7 is a flow chart of a method for application maintenance and deployment according a fourth embodiment of the present invention.

Referring to FIG. 7, FIG. 7 illustrates a flow chart of a method for application maintenance and deployment according a fourth embodiment of the present invention. In this embodiment, the method for application maintenance and deployment includes: step S10, creating a virtual machine running the application; step S20, registering the application to an application management platform; step S30, creating a scheduling deployment policy of the application at the application management platform; step S40, mapping, by the application management platform, the obtained performance of the application instance or the task processing state data of the application instance with the scheduling deployment policy according to the obtained scheduling deployment policy of the application and the performance of the an application instance or task processing state data of the application instance, and issuing a instruction for adjusting deployment of the application and the virtual machine according to the mapping result.

Specifically, when creating a virtual machine running the application in step S10, the virtual machine may be created in two ways. For example, a new virtual machine may be created by using the existing virtual machine to physically copy. Alternatively, a virtual machine mirror is created firstly, and then a virtual machine is created by using the virtual machine mirror as a template. The virtual machine mirror includes software information of the application, and information of the monitoring plug-in, the deployment plug-in and the proxy. Information of the proxy includes application objects managed by the proxy and the rule of realizing the interaction and the communication between the monitoring plug-in data and the deployment plug-in data in the proxy.

The registering the application to the application management platform in step S20 includes: connecting the application to the application management platform, so as to enable communication and data interaction between the application and the application management platform.

In step S40, the instruction for adjusting deployment of the application includes the increase, the combination, or the cancellation of instances of the application, and the adjustment of the association relationship between instances of the application and associated applications. The instruction for adjusting deployment of the virtual machine includes the increase, the combination or the cancellation of virtual machines, and the adjustment of the association relationship between the virtual machine and other virtual machines.

In other embodiments, the application management platform may further perform prediction according to the obtained performance of the application instance or the task processing state data of the application instance, and map the prediction result with the scheduling deployment policy to strengthen anticipation of application management. In addition, in a preferred embodiment, whether to perform step S30 may be determined according to necessary in the circumstances, that is, the scheduling deployment policy of the application may be repeatedly used after creation, and may be adjusted according to the load change of the application instance or other factors. It is not necessary to create a scheduling deployment policy of the application each time deploying the application instance.

Unlike the prior art, in the application maintenance deployment method according to the first embodiment of the present invention, the performance of an application instance or task processing state data of the application instance is obtained, and the application instance is deployed according to the performance or the task processing state data of the application instance. Therefore, the deployment of a large application system such as a BSS/OSS can be performed automatically, and the software system re-architecture needed for a large application system's migration deployment from a traditional silo system to a cloud platform is avoided.

Figure 8:
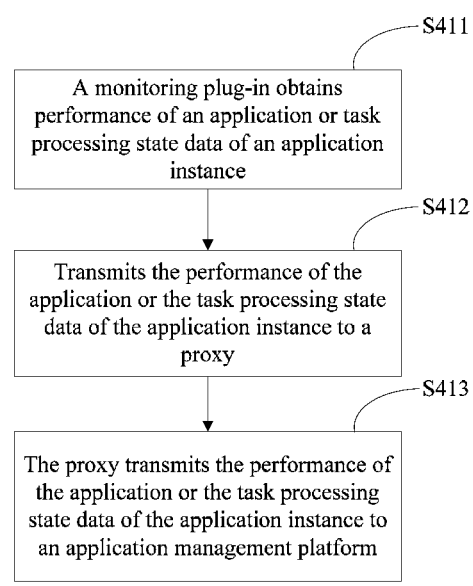
FIG. 8 is a sub-flow chart of step S40 illustrated in FIG. 6 in a fifth embodiment of the present invention.

Referring to FIG. 8, where FIG. 8 is a sub-flow chart of step S40 illustrated in FIG. 7 in a fifth embodiment of the present invention. Step S40 further includes:

In step S411, the monitoring plug-in obtains the performance of the application instance or the task processing state data of the application instance. The monitoring plug-in is set in the application or is connected to the application, and is configured to obtain the performance of the application instance or the task processing state data of the application instance, and further upload the performance of the application instance or the task processing state data of the application instance.

In step S412, the performance of the application instance or the task processing state data of the application instance is transmitted to the proxy. Still further, in step S20, the proxy is registered to the application management platform, so that the application is registered to the application management platform, and the communication between the application and the management platform is built.

In step S413, the proxy transmits the performance of the application instance or the task processing state data of the application instance to the application management.

Figure 9:
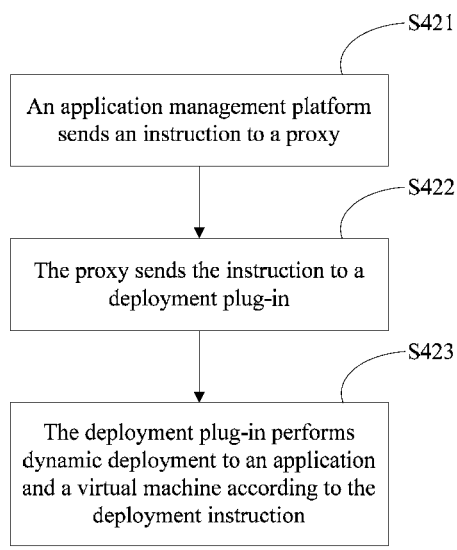
FIG. 9 is a sub-flow chart of step S40 illustrated in FIG. 6 in a sixth embodiment of the present invention.

Referring to FIG. 9, where FIG. 9 is a sub-flow chart of step S40 illustrated in FIG. 7 in a sixth embodiment of the present invention. Step S40 further includes:

In step S421, the application management platform sends the instruction to the proxy.

In step S422, the proxy sends the instruction to the deployment plug-in. Thus it can be seen that the proxy is the communication transit between the application management platform and the application, which enables better data interaction between the application and the application management platform.

In the step S423, the deployment plug-in performs dynamic deployment to the application and the virtual machine according to the deployment instruction.

Figure 10:
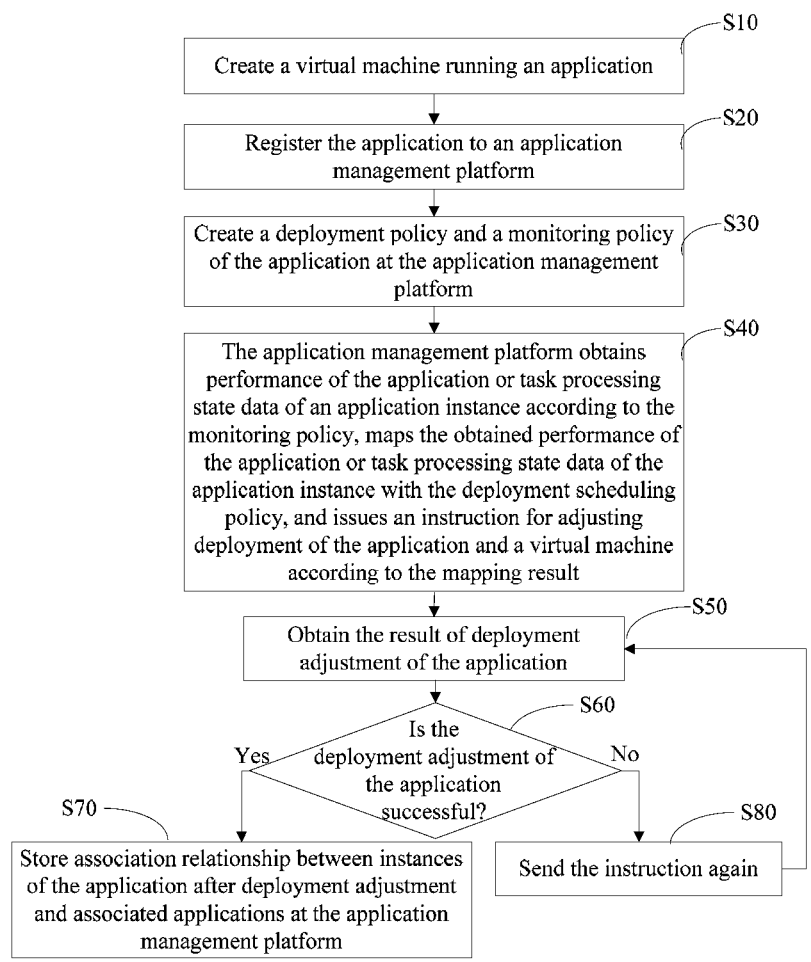
FIG. 10 is a flow chart of a method for application maintenance and deployment according a seventh embodiment of the present invention.

Referring to FIG. 10, where FIG. 10 is a flow chart of a method for application maintenance and deployment according a seventh embodiment of the present invention. In this embodiment, steps S10-S40 are the same as those in the first embodiment. In addition, this embodiment further includes:

In step S50, the result of adjusting the application's deployment is obtained. This step specifically includes obtaining, by the monitoring plug-in, the result of adjusting the application's deployment, such as success or failure in deployment adjustment. The monitoring plug-in sends the obtained result of adjusting the application's deployment to the proxy plug-in, and the proxy plug-in sends the result of adjusting the application's deployment to the application management platform.

In step S60, whether the deployment adjustment of the application is successful is determined. This step is performed by the application management platform. When it is determined that the deployment adjustment of the application is successful, the method proceeds to step S70. When it is determined that the deployment adjustment of the application is unsuccessful, the method proceeds to step S80.

In step S70, the association relationship between the adjusted instances of the application and the associated applications are stored at the application management platform.

In step S80, the instruction is sent again, and then step S50 is repeated. In other embodiments, no operation may be performed in step S80, and the deployment adjustment is performed to the application again when step S40 is performed next time.

The proxy in FIGS. 7-10 is, for example, a proxy module.

In other embodiments, the application maintenance deployment method further includes steps of displaying the performance of an application instance or task processing state data of the application instance, so that a user can know the running state of the application. In addition, the association relationship between instances of the application and associated applications may be further displayed.

Unlike the prior art, in the application maintenance deployment method according to the second to fourth embodiment of the present invention, the performance of an application instance or task processing state data of the application instance are obtained, and the application instance is deployed according to the performance or the task processing state data of the application instance. Therefore, the deployment of a large application system such as a BSS/OSS can be performed automatically, and the software system re-architecture needed for a large application system's migration deployment from a traditional silo system to a cloud platform is avoided.

Figure 11:
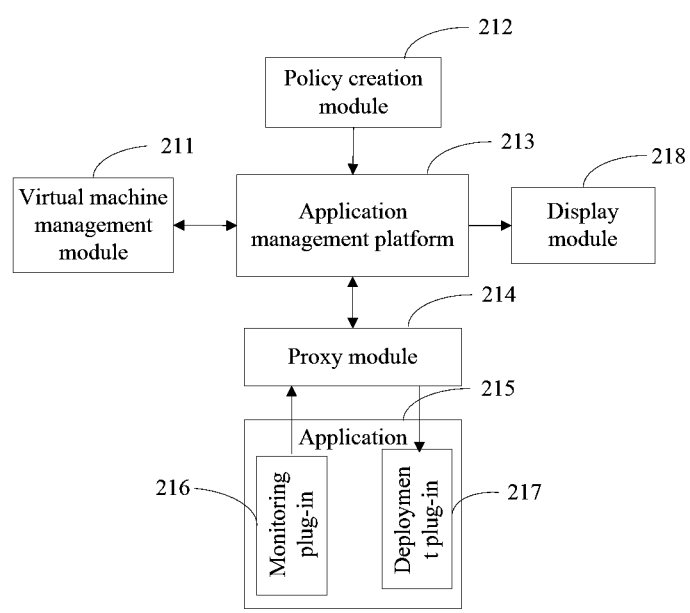
FIG. 11 is a schematic diagram of a system for application maintenance and deployment according an eighth embodiment of the present invention.

Referring to FIG. 11, where FIG. 11 is a schematic diagram of a system for application maintenance and deployment according an eighth embodiment of the present invention. In this embodiment, the application maintenance deployment system includes a virtual machine management module 211, a policy creation module 212, an application management platform 213, a proxy module 214, a monitoring plug-in 216, an application plug-in 217, and a display module 218.

The policy creation module 212 is configured to create a scheduling deployment policy of the application, and send the policy to the application management platform 213.

The virtual machine management module 211 is configured to create a virtual machine (not illustrated) running the application 215. To create a virtual machine, the existing virtual machine may be physically copied to create a virtual machine running the application 215. The virtual machine may also be created by creating management virtual machine mirror and using the created management virtual machine mirror as a template. The virtual machine mirror should include software information of the application 215, and information of the monitoring plug-in 216, the deployment plug-in 217 and the proxy module 214.

Information of the proxy module 214 includes application objects managed by the proxy module 214 and the rule for realizing the interaction and the communication between the monitoring plug-in data 216 and the deployment plug-in data 217 in the proxy module 214. The proxy module 214 is connected to the monitoring plug-in 216 and the deployment plug-in 217, and is registered to the application management platform 213 such that the application 215 is registered to the application management platform 213, thereby building the communication between the application 215 and the application management platform 213. The monitoring plug-in 216 is configured to obtain the performance of the application 215 or the task processing state data of the application 215, and transmit the performance or the task processing state data to the proxy module 214, so that the proxy module 214 transmits the performance or the task processing state data to the application management platform 213 in further. The deployment plug-in 217 is configured to re-deploy the application 215.

The application management platform 213 is configured to map, according to the obtained performance of the application 215 or task processing state data of the application 215, the obtained performance of the application 215 or task processing state data of the application 215 with the scheduling deployment policy, and to issue an instruction for adjusting deployment of the application and the virtual machine according to the mapping result. The application management platform 213 may further perform estimation according to the obtained performance of the application 215 or task processing state data of the application 215, and map the estimation result with the scheduling deployment policy. The instruction is sent to the proxy module 214, and is sent to the deployment plug-in 217 by the proxy module 214 for further being used by the deployment plug-in 217 to re-deploy the application 215. The instruction for adjusting deployment of the application 215 includes the increase, the combination, or the cancellation of instances of the application 215, and the adjustment of the association relationship between instances of the application 215 and associated applications 215. The instruction for adjusting deployment of the virtual machine includes the increase, the combination or the cancellation of virtual machines, and the adjustment of the association relationship between the virtual machine and other virtual machines. If it is needed to perform the deployment adjustment to the virtual machine at the same time, the instruction may be sent to the virtual machine management module 211 at the same time.

The application management platform 213 further obtains the result of deployment adjustment of the application 215, and when the deployment of the application 215 is successful, the association relationship between instances of the application 215 and associated applications 215 are stored. During the process of obtaining the result of deployment adjustment of the application 215, the result is obtained by the monitoring module 216 and is sent to the proxy module 214, and is also sent to the application management platform 213 by the proxy module 214. In other embodiments, the proxy module 214, the monitoring module 216 and the deployment module 217 may be further set in the application management platform 213, the application 215 is registered to the application management platform 213, thereby implementing the communicative connection between the application 215 and the application management platform 213.

The display module 218 is configured to display the performance of the application 215 or the task processing state data of the application 215, so as to enable a user to directly observe the running state of the application. In addition, the display module 218 may further display the association relationship between instances of the application 215 and associated applications 215.

The beneficial effects of the present invention lie in that: in the cloud-based system for application maintenance and deployment, the cloud-based system and method for application maintenance and deployment of the present invention, performance of an application instance or task processing state data of the application instance is obtained, and the application instance is deployed according to the performance or task processing state data of the application instance, thereby enabling automatic deployment of a large application system such as a BSS/OSS, and avoiding software system re-architecture needed for a large application system's migration deployment from a traditional silo system to a cloud platform.

What described above are merely embodiments of the present invention, and are not intended to limit the patent scope of the present invention, and any equivalent structure or equivalent process variation made by use of the description and drawings, or their direct or indirect uses in other related arts are included in the patent scope of the present invention.

What is claimed is:

1. A cloud infrastructure-based method for maintenance and deployment of an application system, comprising:

obtaining a scheduling deployment policy of an application, wherein the scheduling deployment policy of the application includes determining a division of tasks according to a service feature in order to deploy an application as multiple application instances, and determining a decomposition of an application instance according to a decomposition threshold or a combination of application instances according to a combination threshold;

obtaining information regarding performance of an application instance or task processing state data of the application instance;

performing application scheduling deployment according to the scheduling deployment policy of the application and the information regarding the performance of the application instance or the task processing state data of the application instance;

generating a deployment instruction for the application instance; and completing deployment configuration of the application instance, wherein the deployment instruction comprises an application attribute and a range of attribute values, and wherein deploying the deployment instruction comprises deploying the application as multiple application instances, and dividing one application instance into multiple application instances or combining multiple application instances;

wherein the method further comprises:

recording the information regarding the performance of the application instance or the task processing state data of the application instance;

performing trend prediction for the performance of the application instance according to recorded data, and sending the recorded data and the trend prediction;

wherein the method further comprises:

sending, corresponding to coding name of the application instance, the information regarding the performance of the application instance or the task processing state data of the application instance; and sending, corresponding to the coding name of the application instance carried in the deployment instruction, the deployment instruction.

2. The method according to claim 1, wherein the application attribute comprises an application instance name or code and an application service attribute; and wherein the application attribute and the range of attribute values are used to indicate a range of tasks processed for the application instance.

3. The method according to claim 2, wherein performing the application scheduling deployment comprises:

implementing deployment adjustment by using an association relationship between applications, between application instances, or between an application instance and a virtual machine as a decision basis.

4. The method according to claim 1, wherein the application instance is created by a virtual machine based on a virtual machine mirror file, wherein a deployment plug-in is pre-stored in the virtual machine mirror file, and wherein the deployment plug-in is automatically copied to the virtual machine during creation of the virtual machine.

5. The method according to claim 1, wherein the application instance is created by a virtual machine based on a virtual machine mirror file, wherein a monitoring plug-in is pre-stored in the virtual machine mirror file, and wherein the monitoring plug-in is automatically copied to the virtual machine during creation of the virtual machine.

6. The method according to claim 1, wherein the application instance is created by a virtual machine based on a virtual machine mirror file, wherein a proxy module is pre-stored in the virtual machine mirror file, and wherein the proxy module is automatically copied to the virtual machine during creation of the virtual machine.

7. A cloud infrastructure-based management system for maintenance deployment of an application system, comprising at least one processor and at least one non-transitory processor-readable medium having processor-executable instructions stored thereon, the processor-executable instructions comprising:

an application scheduling deployment engine, configured to:

perform application scheduling deployment according to a scheduling deployment policy of an application and information regarding performance of an application instance in the application or task processing state data of the application instance, wherein the scheduling deployment policy of the application includes determining a division of tasks according to a service feature in order to deploy an application as multiple application instances, and determining a decomposition of an application instance according to a decomposition threshold or a combination of application instances according to a combination threshold, and generate a deployment instruction for the application instance, wherein the deployment instruction comprises an application attribute and a range of attribute values, and wherein deploying the deployment instruction comprises deploying the application as multiple application instances, and dividing one application instance into multiple application instances or combining multiple application instances;

a deployment plug-in, configured to obtain the deployment instruction for the application instance from the application scheduling deployment engine and perform deployment configuration for the application instance;

a monitoring plug-in, configured to:

monitor performance or the task processing state of the application instance, and transmit the information regarding the performance of the application instance or the task processing state data of the application instance to the application scheduling deployment engine;

a monitoring and prediction module, configured to:

record the information regarding the performance of the application instance or the task processing state data of the application instance obtained by the monitoring plug-in, perform trend prediction for the performance of the application instance according to recorded data, and send the recorded data and the trend prediction to the application scheduling deployment engine; and a proxy module, wherein the proxy module is configured to:

send, corresponding to coding name of the application instance, the information regarding the performance of the application instance or the task processing state data of the application instance obtained by the monitoring plug-in to the monitoring and prediction module; and send, corresponding to the coding name of the application instance carried in the deployment instruction, the deployment instruction generated by the application scheduling deployment engine to the deployment plug-in in a corresponding application instance.

8. The management system according to claim 7, wherein the application attribute comprises an application instance name or code and an application service attribute, and wherein the application attribute and the range of attribute values are used to indicate a range of tasks processed for the application instance.

9. The management system according to claim 7, wherein the processor-executable instructions further comprise:

an application and virtual machine association topology management module, configured to:

manage an association relationship between applications, between application instances or between an application instance and a virtual machine, and use the association relationship as a decision basis when the application scheduling deployment engine adjusts deployment of the application instance.

10. The management system according to claim 7, wherein the deployment plug-in is written into a virtual machine mirror file in advance;

wherein the deployment plug-in is automatically copied during creation of the virtual machine; and wherein the application instance is further created based on the virtual machine mirror file.

11. The management system according to claim 7, wherein the monitoring plug-in is written into a virtual machine mirror file in advance;

wherein the monitoring plug-in is automatically copied during creation of the virtual machine; and wherein the application instance is further created based on the virtual machine mirror file.

12. The management system according to claim 7, wherein the monitoring plug-in is written into a virtual machine mirror file in advance;
   wherein the proxy module is automatically copied during creation of the virtual machine; and
   wherein the application instance is further created based on the virtual machine mirror file.

13. The management system according to claim 7, wherein the processor-executable instructions further comprise:
   an application deployment policy configuration module, connected to the application scheduling deployment engine and configured to make the scheduling deployment policy for the application scheduling deployment engine.

14. The management system according to claim 7, wherein the processor-executable instructions further comprise:
   a proxy registration and communication module, connected to the proxy module and the application scheduling deployment engine, wherein the proxy module is registered to the proxy registration and communication module, and configured to send the information regarding the performance of the application instance or the task processing state data of the application instance, which further includes a proxy module identification, to the monitoring and prediction module.

15. The management system according to claim 14, wherein the application scheduling deployment engine is configured to send the deployment instruction to the proxy registration and communication module, wherein the deployment instruction includes the proxy module identification;
   wherein the proxy registration and communication module is configured to send the deployment instruction to a specified proxy module according to the proxy module identification; and
   wherein the proxy module is configured to send the deployment instruction to the deployment plug-in.

16. The management system according to claim 7, wherein the processor-executable instructions further comprise:
   a deployment state and running performance monitoring module, connected to the monitoring and prediction module and configured to display the information regarding the performance of the application instance or the task processing state data of the application instance.

17. A cloud infrastructure-based method for maintenance and deployment of an application system, comprising:
   obtaining a scheduling deployment policy of an application, wherein the scheduling deployment policy of the application includes determining a division of tasks according to a service feature in order to deploy an application as multiple application instances, and determining a decomposition of an application instance according to a decomposition threshold or a combination of application instances according to a combination threshold;
   obtaining information regarding performance of an application instance or task processing state data of the application instance;
   performing application scheduling deployment according to the scheduling deployment policy of the application and the information regarding the performance of the application instance or the task processing state data of the application instance;
   generating a deployment instruction for the application instance; and
   completing deployment configuration of the application instance, wherein the deployment instruction comprises an application attribute and a range of attribute values, and wherein deploying the deployment instruction comprises deploying the application as multiple application instances, and dividing one application instance into multiple application instances or combining multiple application instances;
   wherein the application instance is created by a virtual machine based on a virtual machine mirror file,
   wherein a proxy module is pre-stored in the virtual machine mirror file, and
   wherein the proxy module is automatically copied to the virtual machine during creation of the virtual machine.

* * * * *